United States Patent
Suresha et al.

(10) Patent No.: US 12,333,430 B2
(45) Date of Patent: Jun. 17, 2025

(54) SUPER RESOLUTION MACHINE LEARNING MODEL FOR SEISMIC VISUALIZATION GENERATION

(71) Applicant: SCHLUMBERGER TECHNOLOGY CORPORATION, Sugar Land, TX (US)

(72) Inventors: Suhas Suresha, Menlo Park, CA (US); Emilien Dupont, Los Altos, CA (US); Joseph Matthew Chalupsky, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 361 days.

(21) Appl. No.: 17/904,160

(22) PCT Filed: Feb. 12, 2020

(86) PCT No.: PCT/US2020/017820
§ 371 (c)(1),
(2) Date: Aug. 12, 2022

(87) PCT Pub. No.: WO2021/162683
PCT Pub. Date: Aug. 19, 2021

(65) Prior Publication Data
US 2023/0082567 A1 Mar. 16, 2023

(51) Int. Cl.
*G06N 3/00* (2023.01)
*G01V 1/34* (2006.01)
*G06N 3/08* (2023.01)
*G06T 3/4046* (2024.01)
*G06T 3/4053* (2024.01)
*G06V 10/82* (2022.01)

(52) U.S. Cl.
CPC ............... *G06N 3/08* (2013.01); *G01V 1/345* (2013.01); *G06T 3/4046* (2013.01); *G06T 3/4053* (2013.01); *G06V 10/82* (2022.01); *G01V 2210/74* (2013.01)

(58) Field of Classification Search
CPC ............ G06N 3/08; G06N 3/045; G06N 7/01; G06N 20/00; G01V 1/345; G01V 2210/74; G06T 3/4046; G06T 3/4053; G06V 10/82; G06F 18/24133
See application file for complete search history.

(56) References Cited

U.S. PATENT DOCUMENTS

2017/0076209 A1* 3/2017 Sisk .................. G05B 23/0283
2019/0187312 A1 6/2019 Ramox-Martinez et al.
(Continued)

OTHER PUBLICATIONS

Oliveira et al, improving seismic data resolution with deep generative networks, IEEE Geoscience and Remote Sensing Letters, vol. 16, No. 12, pp. 1929-1933, Dec. 2019.*
(Continued)

*Primary Examiner* — Xiao Liu
(74) *Attorney, Agent, or Firm* — Jeffrey D. Frantz

(57) ABSTRACT

A method, apparatus, and program product utilize a super resolution machine learning model to reconstruct high resolution seismic data from low resolution seismic data in connection with generating seismic visualizations, e.g., to reduce storage and/or communication costs associated with generating seismic visualizations.

18 Claims, 9 Drawing Sheets

(56) References Cited

U.S. PATENT DOCUMENTS

| | | | |
|---|---|---|---|
| 2019/0227087 A1* | 7/2019 | Belani | G01N 33/24 |
| 2019/0235109 A1 | 8/2019 | Zhang et al. | |
| 2019/0265375 A1* | 8/2019 | Aqrawi | G01V 1/301 |
| 2019/0277989 A1 | 9/2019 | Shabelansky et al. | |
| 2019/0293818 A1 | 9/2019 | Meek | |
| 2019/0302290 A1* | 10/2019 | Alwon | G01V 1/364 |

OTHER PUBLICATIONS

Hu et al, RTSRGAN: Real-Time Super-Resolution Generative Adversarial Networks, Seventh International Conference on Advanced Cloud and Big Data (CBD) (Year: 2019).*

Lee et al, MobiSR: Efficient On-Device Super-Resolution through Heterogeneous Mobile Processors, MobiCom '19, October 21-25, Los Cabos, Mexico (Year: 2019).*

Vasudevan et al Real-Time Stereo-Vision System for 3D Teleimmersive Collaboratio, IEEE International Conference on Multimedia and Expo, pp. 1208-1213 (Year: 2010).*

Hampson, D. P et al., "Use of multiattribute transforms to predict log properties from seismic data", Geophysics, 66 (1), pp. 220-236.

International Preliminary Report on Patentability of International Patent Application No. PCT/US2020/17820 on Aug. 25, 2022, 11 pages.

S. Peled and Y. Yeshurun, "Super-resolution in MRI: application to human white matter fiber tract visualization by diffusion tensor imaging", Magnetic Resonance in Medicine : official journal of the Society of Magnetic Resonance in Medicine / Society of Magnetic Resonance in Medicine, 45(1):29-35, 2001.

M. W. Thornton, P. M. Atkinson, and D. a. Holland. Sub-pixel mapping of rural land cover objects from fine spatial resolution satellite sensor imagery using super-resolution pixel-swapping. International Journal of Remote Sensing, 27 (3):473-491, 2006.

B. K. Gunturk et al., "Eigenface-domain super-resolution for face recognition", IEEE Transactions on Image Processing, 12(5):597-606, 2003.

L. Zhang et al., "A super-resolution reconstruction algorithm for surveillance images", Signal Processing, 90(3):848-859, 2010.

H. He and W.-C. Siu, "Single image super-resolution using gaussian process regression", In IEEE Conference on Computer Vision and Pattern Recognition (CVPR), pp. 449-456. IEEE, 2011.

W. Shi et al., "Real-Time Single Image and Video Super-Resolution Using an Efficient Sub-Pixel Convolutional Neural Network", In IEEE Conference on Computer Vision and Pattern Recognition (CVPR), pp. 1874-1883, 2016.

R. Dahl et al., "Pixel Recursive Super Resolution," 2017 IEEE International Conference on Computer Vision (ICCV), Venice, pp. 5449-5458, 2017.

C. Ledig et al., "Photo-Realistic Single Image Super-Resolution Using a Generative Adversarial Network," 2017 IEEE Conference on Computer Vision and Pattern Recognition (CVPR), Honolulu, HI, pp. 105-114.

Search Report and Written Opinion of International Patent Application No. PCT/US2020/17820 on May 7, 2020; 12 pages.

Extended European Search Report issued in European Patent Application No. 20918218.7 dated Sep. 22, 2023, 9 pages.

Halpert, A. D. et al., "Deep learning-enabled seismic image enhancement", SEG Technical Program Expanded Abstracts, 2018, 5 pages.

Dutta, P. et al., "3D Conditional Generative Adversarial Networks to enable large-scale seismic image enhancement", arXiv: 1911.06932v1, Cornell University Library, 2019, 9 pages.

Garg, A. et al., "Spatial aliasing removal using deep learning super-resolution", First Break, 2019, 37(9), pp. 87-92.

* cited by examiner

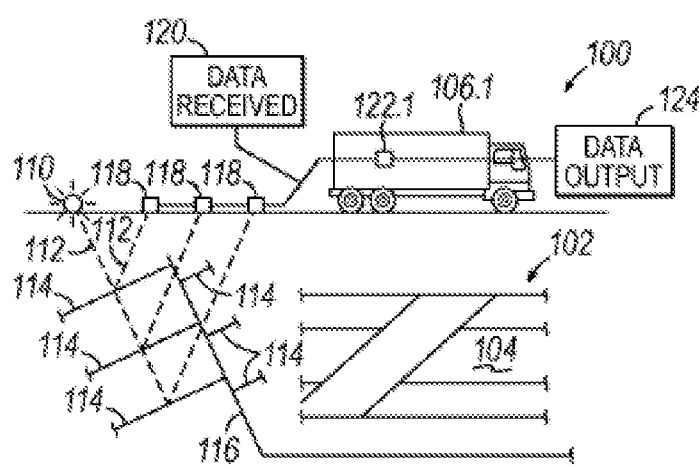
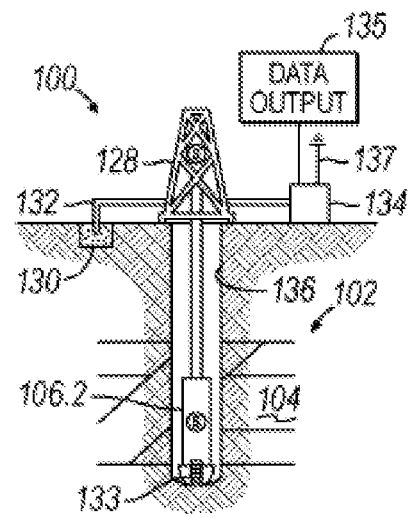
FIG. 2A
FIG. 2B
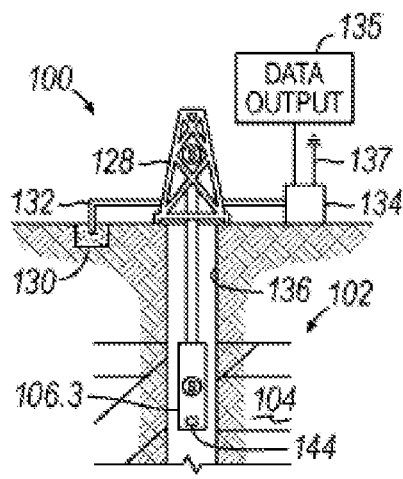
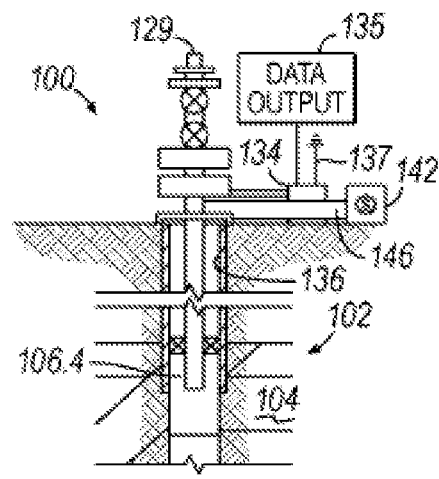
FIG. 2C
FIG. 2D

SUPER RESOLUTION MACHINE LEARNING MODEL FOR SEISMIC VISUALIZATION GENERATION

CROSS-REFERENCE TO RELATED APPLICATION

This application is a national stage entry under 35 U.S.C. 371 of International Application No. PCT/US2020/017820, filed Feb. 12, 2020.

BACKGROUND

Simulation and modeling software are used throughout the oil & gas industry for exploration, appraisal, development and production of oil fields. In addition, visualization tools incorporated into or external to such software may be used to display and manipulate representations of petroleum reservoirs that are modeled as large volumes subdivided into cells, with each cell storing properties of the reservoir in particular locations in the reservoir. For example, three-dimensional seismic data may be collected from a subsurface formation to characterize the substructure of a region of the earth, with the substructure identifying potential areas containing recoverable hydrocarbons. The seismic data may be organized into volumes generally referred to as seismic cubes, which can incorporate massive amounts of data. In order to visualize the seismic data, seismic "slices," which capture cross sections of seismic data, may be generated and displayed to users within seismic visualizations to assist with interpretation of the seismic data. Nonetheless, the underlying data used to generate such visualizations is generally voluminous so it can be extremely network and/or memory intensive to load and store seismic data used to render seismic visualizations. Furthermore, the quality of seismic visualizations is often dependent upon the resolution used to render the visualizations, so it is generally desirable to render seismic visualizations at higher resolutions to facilitate interpretation by users.

Therefore, a need continues to exist for a manner of rendering seismic visualizations in a computationally efficient and understandable manner.

SUMMARY

The implementations disclosed herein provide a method, apparatus, and program product that utilize a super resolution machine learning model to reconstruct high resolution seismic data from low resolution seismic data in connection with generating seismic visualizations. In various implementations, the super resolution machine learning model may be used to reduce storage and/or communication costs associated with generating seismic visualizations.

Therefore, consistent with one aspect of the invention, a method of rendering a seismic visualization may include receiving low resolution seismic data, the low resolution seismic data representative of a portion of a subsurface formation, processing the low resolution seismic data with a super resolution machine learning model to reconstruct high resolution seismic data therefrom, and generating a seismic visualization of the subsurface formation that includes a rendering of the reconstructed high resolution seismic data.

In some embodiments, processing the low resolution seismic data with the super resolution machine learning model is performed prior to generating the seismic visualization, and generating the seismic visualization of the subsurface formation uses the reconstructed high resolution seismic data to generate the seismic visualization. Also, in some embodiments, processing the low resolution seismic data with the super resolution machine learning model is performed on a low resolution seismic visualization generated from the low resolution seismic data and in connection with generating the seismic visualization of the subsurface formation that includes the rendering of the reconstructed high resolution seismic data. Further, in some embodiments, processing the low resolution seismic data with the super resolution machine learning model to reconstruct high resolution seismic data therefrom is performed as a batch process. In some embodiments, processing the low resolution seismic data with the super resolution machine learning model to reconstruct high resolution seismic data therefrom is performed dynamically in connection with generating the seismic visualization.

In addition, in some embodiments, receiving the low resolution seismic data and processing the low resolution seismic data with the super resolution machine learning model are performed in a cloud-based virtualization engine in communication with a remote visualization client. In some embodiments, the cloud-based virtualization engine is resident in a virtual machine in a cloud-based computing environment. In addition, in some embodiments, generating the seismic visualization of the subsurface formation that includes the rendering of the reconstructed high resolution seismic data is performed by a cloud-based virtualization engine, and the method further includes communicating the seismic visualization to the remote visualization client for display thereon.

Moreover, in some embodiments, receiving the low resolution seismic data and processing the low resolution seismic data with the super resolution machine learning model are performed in a visualization client in communication with a cloud-based virtualization engine. In some embodiments, receiving the low resolution seismic data includes, with the visualization client, receiving a low resolution seismic visualization generated by the cloud-based virtualization engine, and processing the low resolution seismic data with the super resolution machine learning model is performed on the low resolution seismic visualization. Some embodiments may also include, in the cloud-based virtualization engine, generating the low resolution seismic visualization from low resolution seismic data. Some embodiments may further include in the cloud-based virtualization engine, generating a high resolution seismic visualization from high resolution seismic data, and generating the low resolution seismic visualization by compressing the high resolution seismic visualization generated by the cloud-based virtualization engine.

In some embodiments, the seismic data includes two-dimensional or three-dimensional seismic data. In addition, in some embodiments, the seismic data includes a seismic cube. In some embodiments, the seismic data includes one or more spatially-distributed derived seismic attributes. Moreover, in some embodiments, the super resolution machine learning model includes a sub-pixel convolutional neural network model or a pixel-recursive super resolution model.

Consistent with another aspect of the invention, an apparatus may include a computing system including one or more processors, and program code configured upon execution by the one or more processors to render a seismic visualization by receiving low resolution seismic data, the low resolution seismic data representative of a portion of a subsurface formation, processing the low resolution seismic data with a super resolution machine learning model to reconstruct high resolution seismic data therefrom, and generating a seismic visualization of the subsurface formation that includes a rendering of the reconstructed high resolution seismic data.

Also, in some embodiments, at least a portion of the program code is resident in a cloud-based visualization engine. In some embodiments, at least a portion of the program code is resident in a visualization client in communication with a cloud-based visualization engine.

Consistent with another aspect of the invention, a program product may include a non-transitory computer-readable medium, and program code stored on the non-transitory computer-readable medium and configured upon execution by a computing system including one or more processors to render a seismic visualization by receiving low resolution seismic data, the low resolution seismic data representative of a portion of a subsurface formation, processing the low resolution seismic data with a super resolution machine learning model to reconstruct high resolution seismic data therefrom, and generating a seismic visualization of the subsurface formation that includes a rendering of the reconstructed high resolution seismic data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example implementations of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

Figure 1:
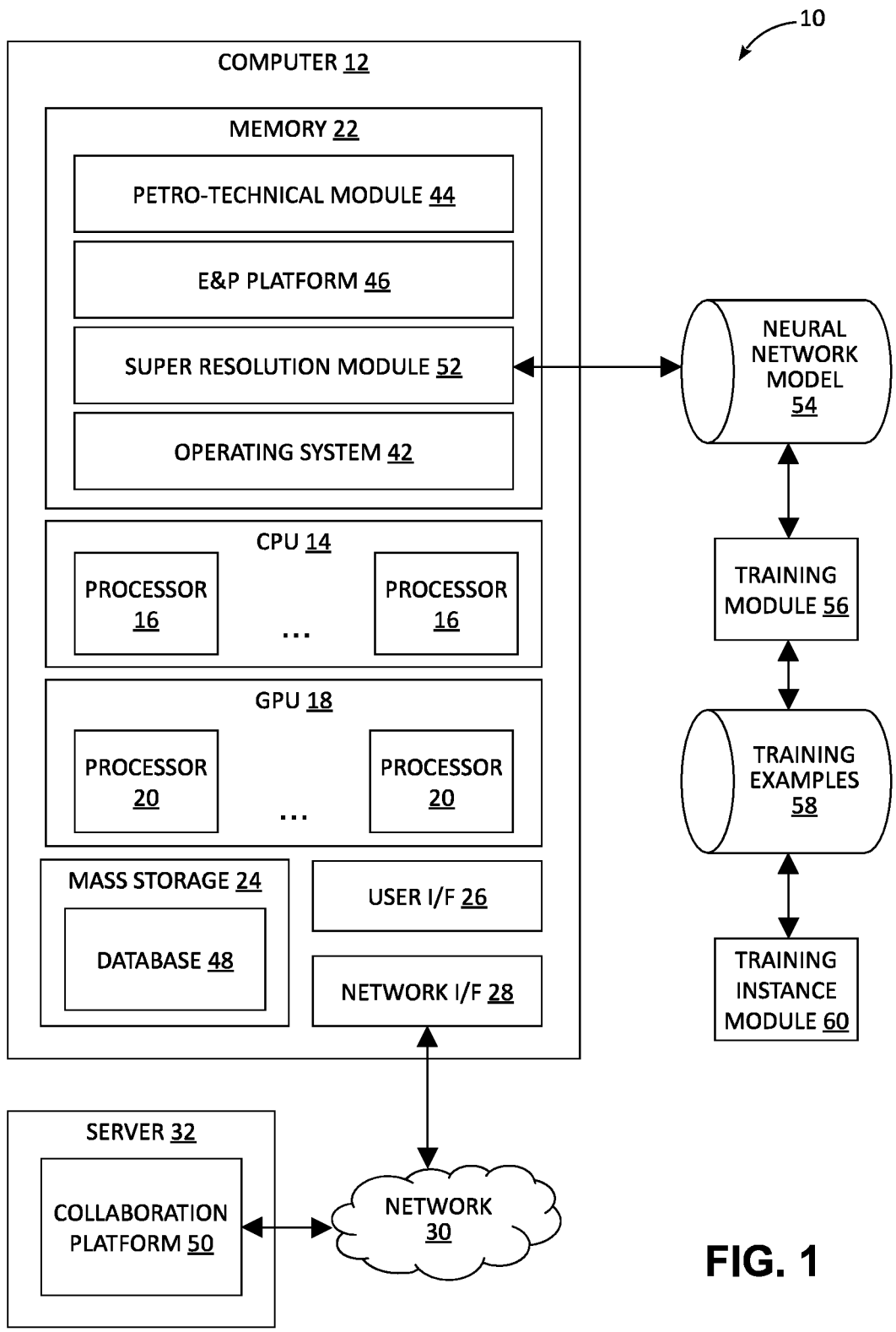
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16 as well as a graphics processing unit (GPU) 18 including at least one hardware based processor or processing core 20, e.g., as may be implemented in integrated graphics or in an external adapter card. CPU 14 is coupled to a memory 22, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 22 may be considered to include memory storage physically located elsewhere in a computer 12, e.g., any cache memory in a microprocessor or processing core, as well as any storage capacity used as a virtual memory, e.g., as stored on a mass storage device 24 or on another computer coupled to a computer 12.

Each computer 12 also generally receives a number of inputs and outputs for communicating information externally. For interface with a user or operator, a computer 12 generally includes a user interface 26 incorporating one or more user input/output devices, e.g., a keyboard, a pointing device, a display, a printer, etc. Otherwise, user input may be received, e.g., over a network interface 28 coupled to a network 30, from one or more external computers, e.g., one or more servers 32 or other computers 12. A computer 12 also may be in communication with one or more mass storage devices 24, which may be, for example, internal hard disk storage devices, external hard disk storage devices, storage area network devices, etc.

A computer 12 generally operates under the control of an operating system 42 and executes or otherwise relies upon various computer software applications, components, programs, objects, modules, data structures, etc. For example, a petro-technical module or component 44 executing within an exploration and production (E&P) platform 46 may be used to access, process, generate, modify or otherwise utilize petro-technical data, e.g., as stored locally in a database 48 and/or accessible remotely from a collaboration platform 50. Collaboration platform 50 may be implemented using multiple servers 32 in some implementations, and it will be appreciated that each server 32 may incorporate a CPU, memory, and other hardware components similar to a computer 12.

In one non-limiting implementation, for example, E&P platform 46 may implemented as the PETREL Exploration & Production (E&P) software platform, while collaboration platform 50 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In many implementations, computer 12 includes super resolution module 52 which can be utilized in connection with performing a super resolution operation to reconstruct high resolution seismic data from low resolution seismic data in connection with generating seismic visualizations using CPU 14 and GPU 18. Super resolution module 52, as will be discussed in greater detail below, may incorporate one or more machine learning or neutral network models 54, and in connection with training such models, a training module 56 may utilize one or more training examples 58 generated by a training instance module 60, as will also be discussed in greater detail below.

In general, the routines executed to implement the implementations disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while implementations have and hereinafter will be described in the context of fully functioning computers and computer systems, those skilled in the art will appreciate that the various implementations are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 12. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific implementation of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
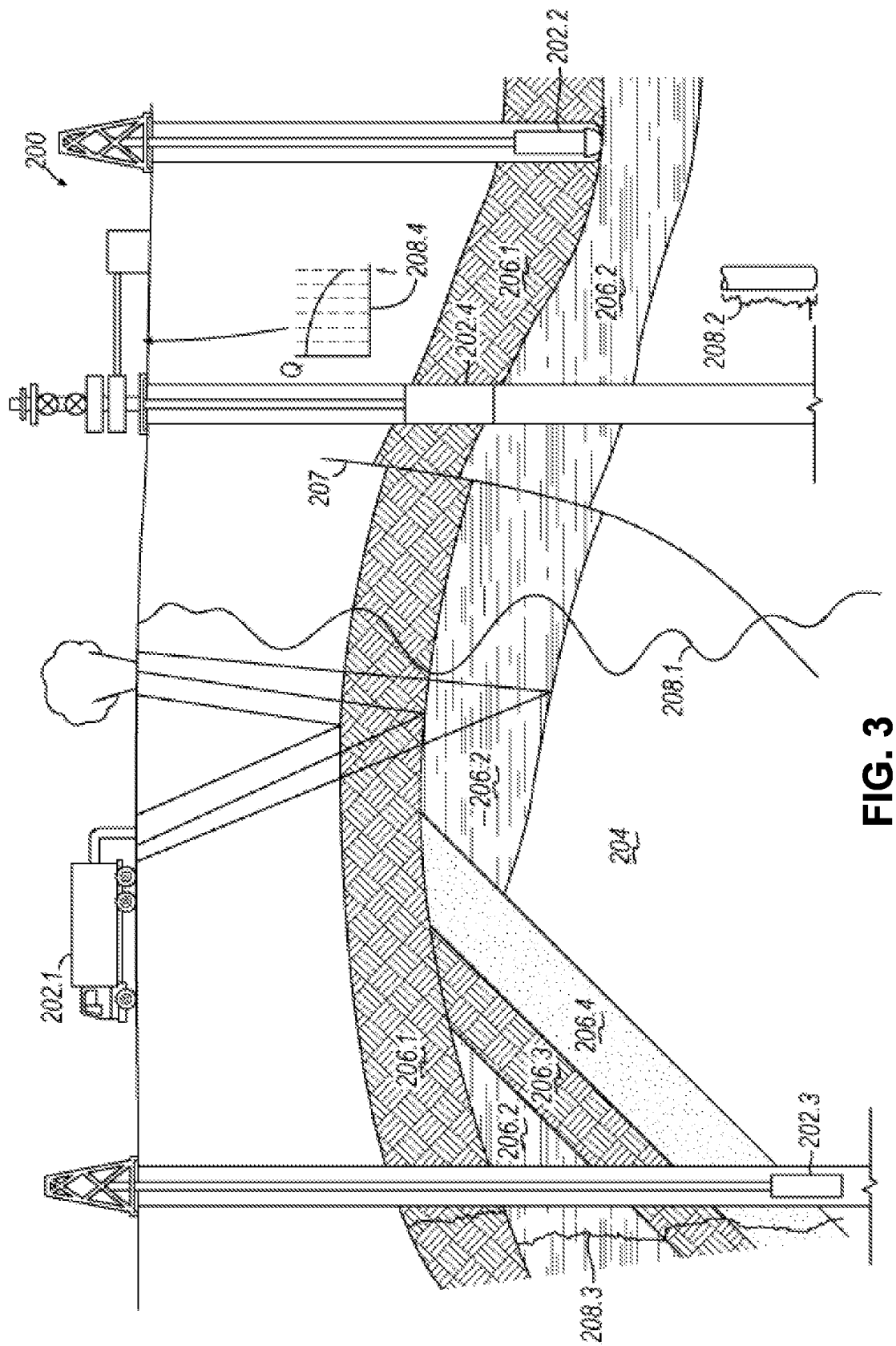
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
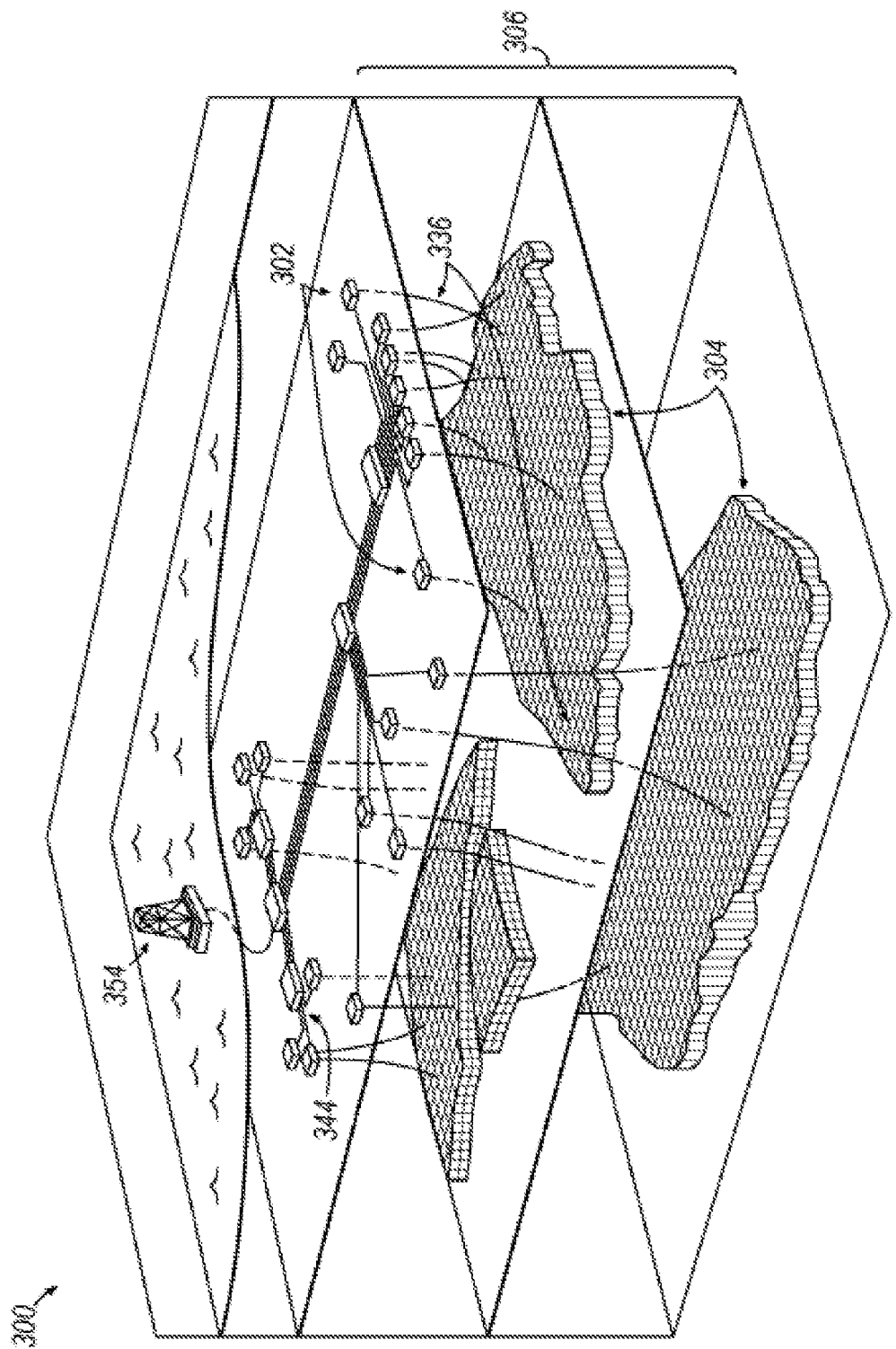
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Rendering Seismic Data with Super Resolution

The ability to analyze the internals of a three-dimensional structure can be beneficial for the oil and gas industry, e.g., for viewing seismic information. Seismic data sets may be intersected by planes, so as to see a cross-section of the data, which is referred to as a seismic slice. Display of seismic slices may allow a user such as a geophysical interpreter to construct virtual subsurface structures. Subsequent workflows may use the structures to build large models of entire reservoirs and run fluid simulations in order to discover potential hydrocarbons and avenues for oil and gas production. It will also be appreciated that seismic data may be considered to include raw or processed seismic data collected from one or more seismic surveys, as well as other types of seismic data such as various attributes that may be derived from collected seismic data, e.g., data reflecting differences between seismic surveys collected at different points in time.

Seismic data may therefore be considered to include in some embodiments data organized into two or three dimensions and providing information about the reflected seismic energy received during one or more seismic surveys, and indicative of the subsurface geology. Seismic data may also include various seismic attributes derived from raw seismic traces in some embodiments. Seismic data may be processed using techniques such as deconvolution, stacking, and migration (among others), and as such, seismic "images" such as two-dimensional seismic slices taken from seismic cubes, differ appreciably from images that are captured, for example, using a camera, insofar as the seismic images generally represent spatially-distributed raw or derived seismic attributes, in some instances based on the combination of multiple seismic traces (i.e., traces of pressure wave amplitudes over time responsive to seismic events) captured from multiple locations and perspectives and otherwise processed to indicate the boundaries between subsurface geological structures, rather than a two-dimensional representation of a field of view captured by a camera.

Seismic data is generally organized into volumes often referred to as seismic cubes that can represent relatively large volumes in a subsurface formation, and as a result, can include massive amounts of seismic data therein. Generating visualizations of such seismic data, e.g., for interpretation by a user, may therefore incorporate in part reading massive seismic cubes, which can lead to high computational, storage and communication costs within a data processing system. Moreover, it is often desirable to support real time or interactive visualization that enables a user to move through a seismic cube to view seismic data from different viewpoints, e.g., by panning, rotating, zooming, slicing, etc., such that new visualizations are generated in response to user input.

Furthermore, it has more recently become desirable to utilize cloud-based environments within the oil & gas industry, such that the communication costs associated with communicating data between servers within a cloud and client computers can place further constraints on the ability to generate smooth and responsive interactive visualizations of seismic data.

As will become more apparent below, embodiments consistent with the invention may utilize a super resolution machine learning model to reconstruct high resolution seismic images or sequences from observed low resolution seismic images. Such a model may be used, for example, in connection with the compression of seismic data, with improving the quality of low resolution seismic surveys, with reducing computational overhead associated with visualization by loading low resolution images that are super-resolved for real-time visualization, among other potential applications. It will be appreciated that what is considered "low" resolution versus "high" resolution seismic data may vary in different embodiments. However, it will be appreciated that, relative to low resolution seismic data, high resolution seismic data generally has a higher resolution than the low resolution seismic data representing the same portion of a subsurface formation. In some embodiments, for example, high resolution seismic data represents seismic data having a resolution that is at least twice that of the low resolution seismic data for the same portion of a subsurface formation. Further, in some embodiments, high resolution seismic data may have a resolution that is at least three or four times that of the low resolution seismic data, if not more.

It has been found, for example, that real-time visualization of seismic images in a cloud computing environment comes with many challenges. These seismic volumes can be massive in size, ranging from a few gigabytes to hundreds of terabytes. Loading such massive volumes can be time-consuming and resource intensive due to limitations in data transfer speed and memory constraints. To some degree, efficient data formats such as ZGY may be used to mitigate some of these effects, as such data formats generally combine spatial data decomposition and multiple levels-of-details to provide a visualization data structure that takes advantage of a computer's memory hierarchy and the idea that the resolution of the data can be tied to the viewpoint of a user. Super resolution techniques as described herein, while not limited to such applications, can further improve such applications in terms of saving memory and computational resources. In some instances, for example, super resolution techniques such as those disclosed herein may enable lower resolution seismic images to be stored and/or communicated and super resolved on demand during real-time visualization.

A seismic visualization, in this regard, may be considered to be a display of seismic-related information that is, for example, displayed on a local computer display upon which the visualization is generated or communicated to a remote computer for display thereon. The seismic visualization may include one or more seismic images, and may include additional alphanumeric data, legends, colors, user interface components, etc. In some embodiments, for example, a seismic visualization may include a display of a seismic "slice" taken through a subsurface formation, optionally rendered as a surface in a three-dimensional object representing the subsurface formation.

Figure 5:
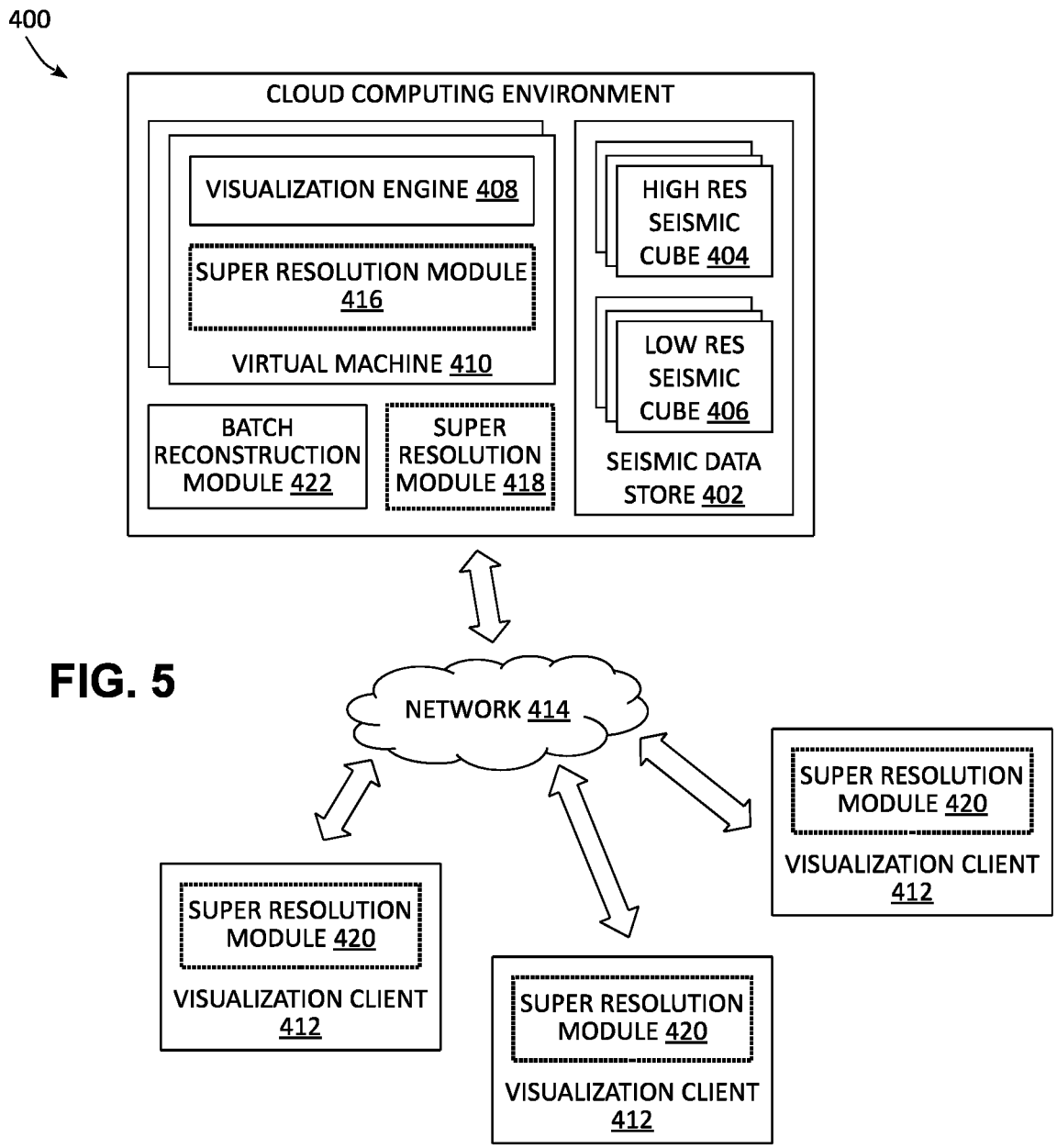
FIG. 5 illustrates an example cloud-based real-time seismic visualization system suitable for implementation of various technologizes and techniques described herein.

FIG. 5 illustrates an example cloud computing environment 400 suitable for implementing cloud-based real-time seismic visualization consistent with some embodiments of the invention. In this environment, a seismic data store 402 is illustrated including both high resolution and low resolution seismic data, organized respectively into high resolution seismic cubes 404 and low resolution seismic cubes 406. In other embodiments, seismic data store 402 may store only low resolution or high resolution seismic data.

Environment 400 may implement real-time seismic visualization, for example, by utilizing a visualization engine 408 running within one of multiple virtual machines 410 in the cloud computing environment and capable of generating visualization data, e.g., a stream of images, to one or more visualization clients 412 coupled to the environment via one or more networks 414. The visualization clients 412 may be coupled, for example, over a private local or wide-area network and/or over the Internet, and may interact with visualization engine 408 to receive different views of the seismic data in one or more seismic cubes, e.g., for the purpose of interpreting the seismic data.

In connection with rendering seismic data from seismic data store 402 into a visualization for display by a visualization client 412, a super resolution machine learning model may be used in some embodiments to reconstruct high resolution seismic data from low resolution seismic data to reduce memory, storage, communication and/or computational costs associated with generating visualizations. As such, in different embodiments, a super resolution machine learning model may be implemented within a super resolution module that operates at different points within the data flow between the visualization engine 408 and a visualization client 412, e.g., as represented by super resolution module 416 resident in a virtual machine 410, super resolution module 418 resident external of a virtual machine 410 but within the cloud environment, or a super resolution module 420 resident within a visualization client. It will be appreciated that any of modules 416-420 may be omitted in some embodiments.

Furthermore, it may also be desirable to utilize super resolution for other purposes within environment 400, e.g., in connection with performing batch reconstruction operations using a batch reconstruction module 422. Module 422, for example, may be used to generate one or more high resolution seismic cubes 404 from one or more low resolution seismic cubes 406 as a batch process such that super resolution need not be performed dynamically within a visualization data flow, or to enhance seismic data that was captured or stored at a lower resolution.

Figure 6:
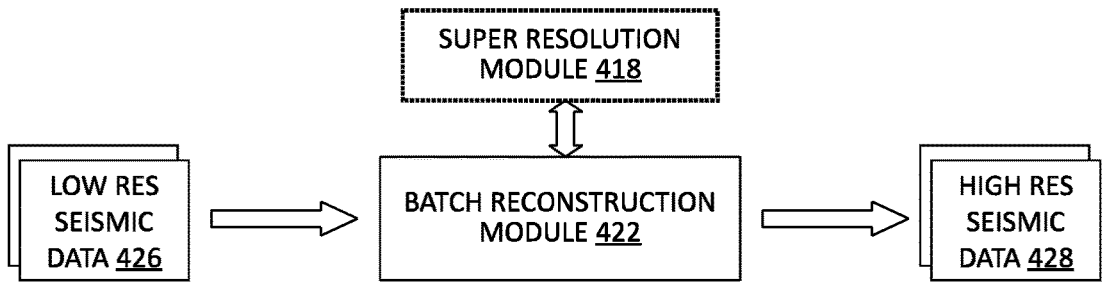
FIG. 6 is a block diagram of an example implementation of a batch reconstruction operation capable of being performed with the system of FIG. 5.

FIGS. 6-10, for example, illustrate various data flows that may utilize a super resolution machine learning model in different embodiments. FIG. 6, for example, illustrates a batch reconstruction operation performed by batch reconstruction module 422, by which low resolution seismic data 426 is processed in a batch to generate high resolution seismic data 428 using super resolution module 418. The batch reconstruction operation may be used, for example, to generate new higher resolution data within seismic data store 402, or for other purposes.

Figure 7:
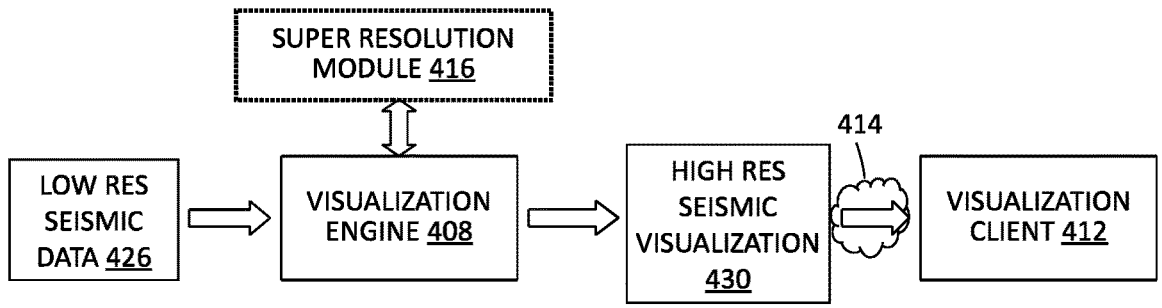
FIG. 7 is a block diagram of an example implementation of a visualization generation operation capable of being performed with the system of FIG. 5.

FIG. 7 illustrates an example visualization generation operation where visualization engine 408 processes low resolution seismic data 426 to generate a high resolution seismic visualization 430, in part using super resolution module 416 to generate high resolution seismic data incorporated into the high resolution seismic visualization. The high resolution seismic visualization 430 may then be communicated over network 414 to a visualization client 412 for rendering to a user. It will be appreciated that in this operation, the super resolution operation may enable seismic data to be stored in data store 402 at a lower resolution, thereby reducing storage costs; however, high resolution data is still communicated over network 414.

Figure 8:
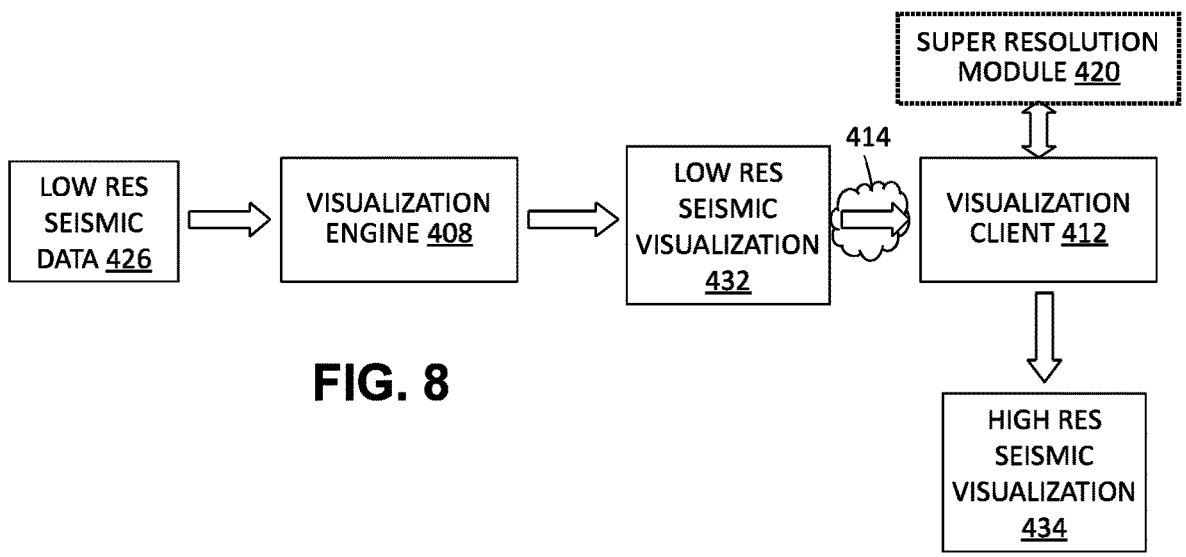
FIG. 8 is a block diagram of another example implementation of a visualization generation operation capable of being performed with the system of FIG. 5.

FIG. 8 illustrates another example visualization generation operation where visualization engine 408 processes low resolution seismic data 426 to generate a low resolution seismic visualization 432, which may then be communicated over network 414 to a visualization client 412 for rendering to a user. In this case, however, visualization client 412 utilizes super resolution module 420 to generate a high resolution seismic visualization 434 for rendering to a user. Thus, it will be appreciated that in this operation, the super resolution operation may enable seismic data to be both stored in data store 402 and communicated to visualization client 412 at a lower resolution, thereby reducing both storage and communication costs, as well as computational and/or memory costs in the cloud in some environments as the visualization engine 408 is only required to generate a low resolution seismic visualization.

Figure 9:
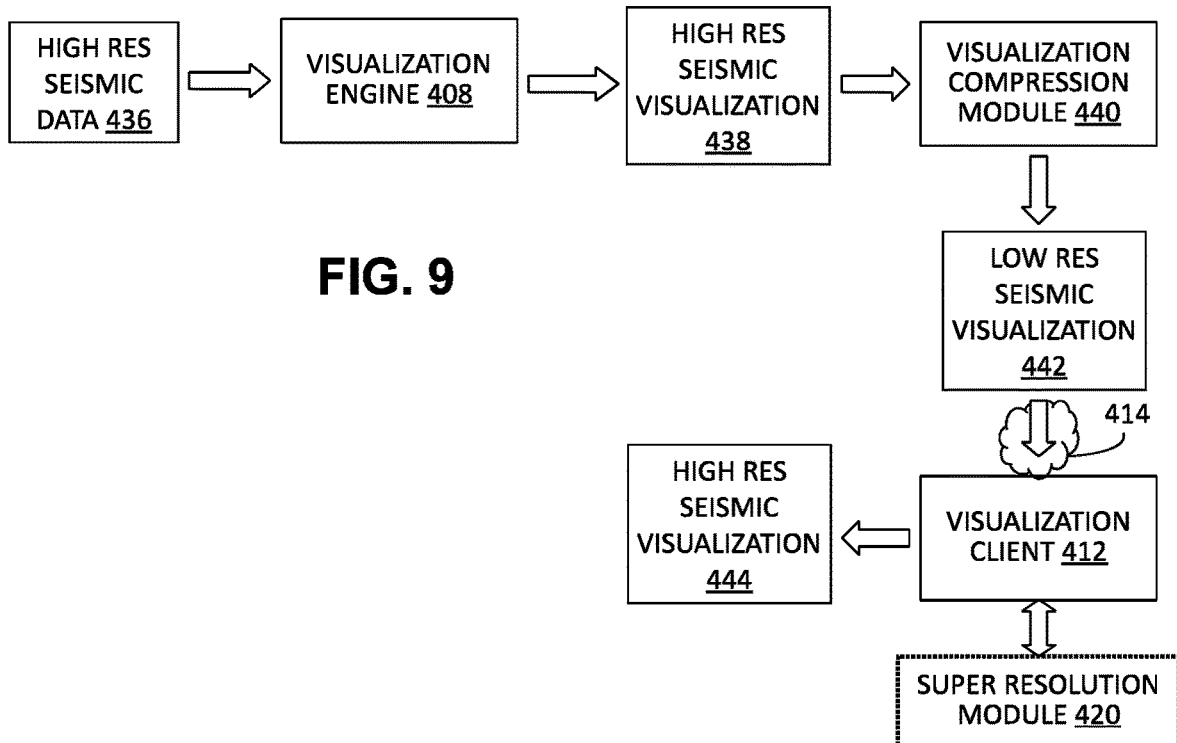
FIG. 9 is a block diagram of an example implementation of yet another visualization generation operation capable of being performed with the system of FIG. 5.

FIG. 9 illustrates yet another example visualization generation operation where visualization engine 408 instead processes high resolution seismic data 436 to generate a high resolution seismic visualization 438, which may then be compressed by a visualization compression module 440 to generate a low resolution seismic visualization 442, which is then communicated over network 414 to a visualization client 412 for rendering to a user, but with super resolution module 420 used to reconstruct a high resolution seismic visualization 444 for rendering to a user. Thus, it will be appreciated that in this operation, the super resolution operation may be used primarily to reduce communication costs over network 414, as visualization engine 408 operates on high resolution seismic data to generate a high resolution seismic visualization.

Figure 10:
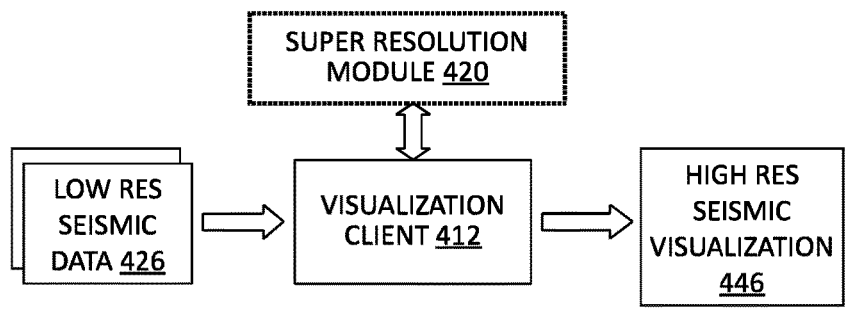
FIG. 10 is a block diagram of an example implementation of a visualization generation operation capable of being performed entirely within a client of the system of FIG. 5.

It will also be appreciated that while super resolution module 420 in FIGS. 8 and 9 is used on lower resolution seismic visualizations in some embodiments, in other embodiments, super resolution module 420 may be used to reconstruct high resolution seismic data from low resolution seismic data. FIG. 10, for example, illustrates a visualization generation operation where visualization client 412 processes low resolution seismic data 426 using super resolution module 420 to generate a high resolution seismic visualization 446 for rendering to a user. The low resolution seismic data 426 may be provided by cloud computing environment 400 in some embodiments, while in other embodiments, FIG. 10 may represent a stand-alone implementation where visualization client 412 is not coupled to a cloud-based environment. In one example implementation, for example, a cloud-based environment may provide a low resolution seismic cube to a visualization client over a network, thereby reducing bandwidth requirements, and the visualization client may reconstruct high resolution seismic data from the seismic cube and generate high resolution visualizations based thereon. Also, in some implementations, the reconstruction of high resolution seismic data may be performed upon receipt of low resolution seismic data by a visualization client for later use in rendering visualizations, while in other embodiments, the reconstruction of high resolution seismic data may occur dynamically and in association with rendering a particular visualization.

Figure 11:
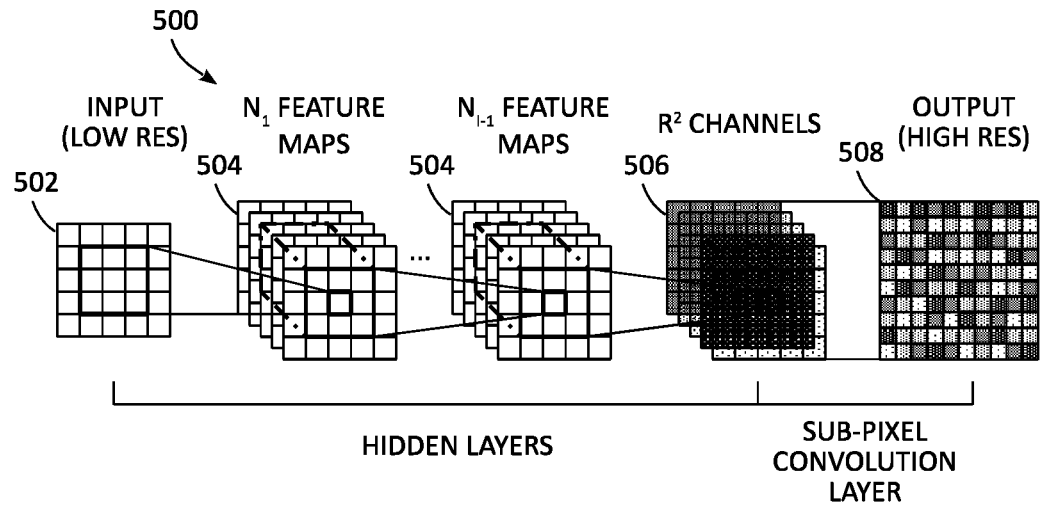
FIG. 11 is a block diagram illustrating one example implementation of a super resolution machine learning model capable of being implemented in the system of FIG. 5.
Figure 12:
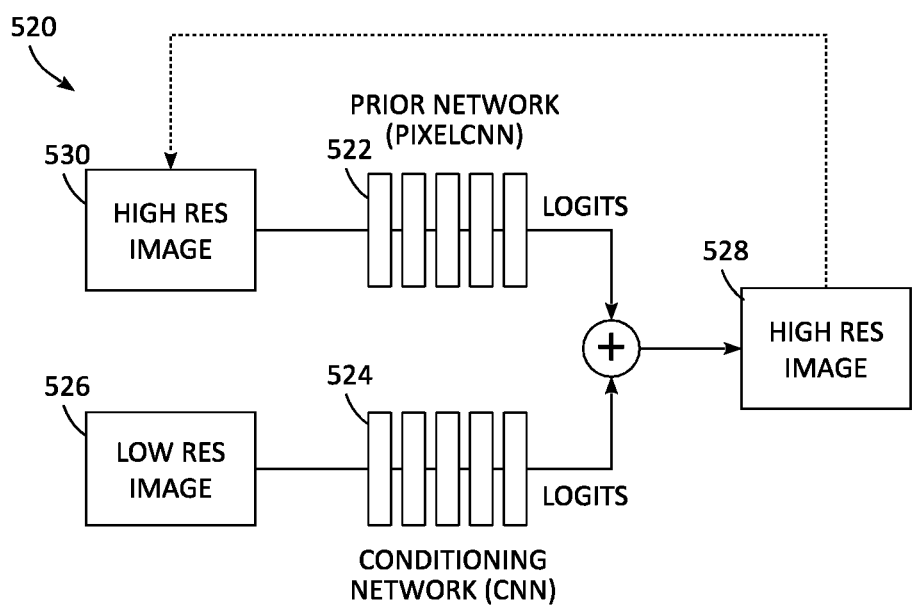
FIG. 12 is a block diagram illustrating another example implementation of a super resolution machine learning model capable of being implemented in the system of FIG. 5.

While a number of different machine learning models may be used to implement a super resolution machine learning model in various embodiments, FIGS. 11 and 12 illustrate two example models that may be used in some embodiments. FIG. 11, for example, illustrates a sub-pixel convolutional neural network (CNN) 500 that offers stable training and relatively fast inference. CNN 500 takes as input a low resolution seismic image 502 and includes two convolution layers 504 for feature maps extraction and a sub-pixel convolution layer 506 that aggregates the feature maps from the low resolution space and builds the super-resolved image 508 in a single step. Since the feature maps are extracted in the low resolution space, this model generally reduces the computational complexity of the operation, and thus provides relatively fast inference with reasonable computational overhead. In some embodiments, however, such a model may be better suited for use with lower magnification ratios (e.g., 3× and lower).

FIG. 12 illustrates a pixel-recursive super-resolution (PRSR) model 520 that uses an autoregressive generative model known as PixelCNN to perform accurate super-resolution for higher-magnification ratios. In the regime of high magnification factors, the problem may be underspecified and many plausible, high resolution images may match a low resolution image. Using PRSR model 520, which combines autoregressive PixelCNN decoders 522 with a conditional probabilistic model or conditioning network 524, low resolution images 526 may generally be used to generate realistic super-resolved high resolution images 528, even for high magnification ratios, with high resolution images 530 fed back into the autoregressive PixelCNN decoders 522.

Figure 13:
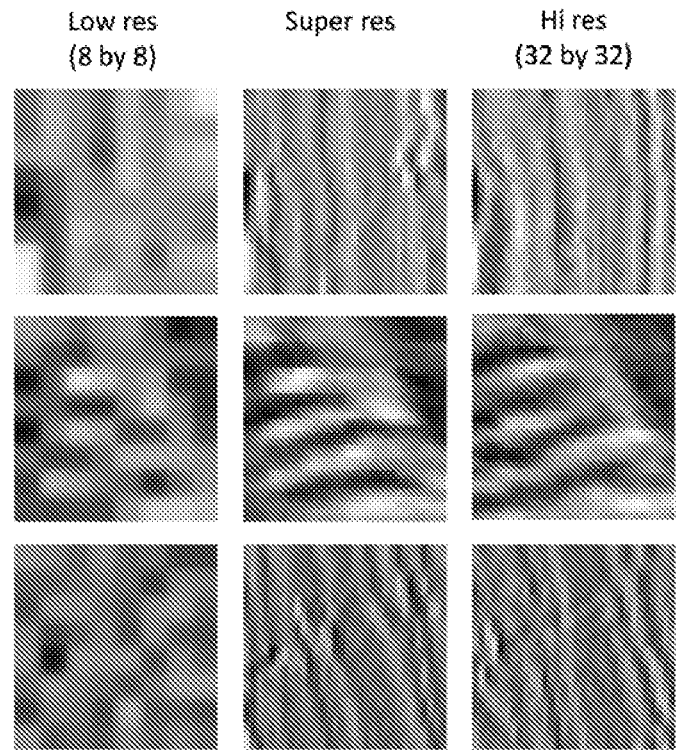
FIG. 13 illustrates example sets of low and high resolution seismic image pairs along with reconstructed high resolution seismic images generated therefrom using a super resolution machine learning model consistent with some aspects of the invention.

Models 500, 520 may be trained on an input dataset including large numbers of pairs of low resolution (e.g., 8×8, 32×32, etc.) and high resolution (e.g., 32×32, 64×64, etc.) seismic images. In some embodiments it may be desirable to split images from the input dataset into training and test sets using a 80:20 ratio. FIG. 13, for example, illustrates example image pairs of low resolution (8×8, left column) and high resolution (32×32, right column) seismic images, corresponding to a magnification factor of 4, with the results of processing by a trained PRSR model 520 shown in the center column.

It will be appreciated that seismic images may be in two or three dimensions, and in some embodiments may be orders of magnitude larger than what is considered in the example images from FIG. 13. As such, in some embodiments it may be desirable to split larger seismic volumes into smaller images and process in parallel to overcome memory constraints. In addition, when parallel processing is used, super-resolved high resolution images may need to be stitched together, which could lead to discontinuities in the high resolution domain. As such, it may also be desirable in some embodiments to process overlapping images in parallel and use averaging techniques to ensure continuity in the high resolution domain.

Figure 14:
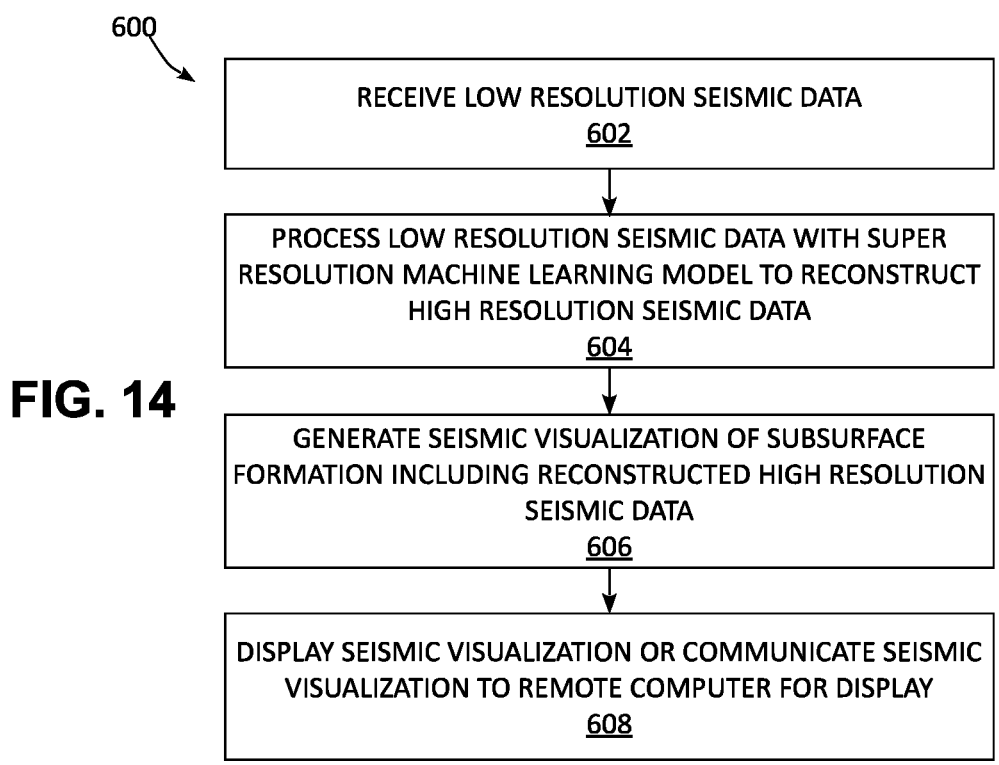
FIG. 14 is a flowchart illustrating an example sequence of operations for rendering a seismic visualization using the system of FIG. 5.

FIG. 14 illustrates an example sequence of operations 600 for rendering seismic visualizations consistent with some embodiments. First, in block 602, low resolution seismic data is received, and then in block 604, the low resolution seismic data is processed with a super resolution machine learning model as described herein to reconstruct high resolution seismic data from the low resolution seismic data. As noted above, this processing may occur in some embodiments prior to generating a visualization, while in other embodiments this processing may be performed on a previously-generated low resolution visualization.

Next, in block 606, a seismic visualization of the subsurface formation may be generated that includes the reconstructed high resolution seismic data. Then, in block 608, the seismic visualization may be displayed locally (i.e., on the same computer that generated the seismic visualization) or may be communicated to a remote computer for display thereon. The sequence of operations is then complete.

Although the preceding description has been described herein with reference to particular means, materials, and implementations, it is not intended to be limited to the particular disclosed herein. By way of further example, implementations may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, implementations extend to all functionally equivalent structures, methods, uses, program products, and compositions as are within the scope of the appended claims. In addition, while particular implementations have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of rendering a seismic visualization, the method comprising:
    receiving high resolution seismic data at a visualization engine running in a virtual machine (VM) on a cloud server, the high resolution seismic data representative of a portion of a subsurface formation;
    generating, at the visualization engine running in the VM on the cloud server, a high resolution seismic visualization of the subsurface formation from the high resolution seismic data, wherein the generating includes rendering of the high resolution seismic data;
    compressing, at the visualization engine running in the VM on the cloud server, the high resolution seismic visualization to generate a low resolution seismic visualization;
    communicating the low resolution seismic visualization from the cloud server to a remote visualization client;
    processing, at the remote visualization client, the low resolution seismic visualization with a super resolution machine learning model to reconstruct the high resolution seismic visualization; and
    displaying, via the remote visualization client, the high resolution seismic visualization to a user.

2. The method of claim 1, wherein processing the low resolution seismic visualization with the super resolution machine learning model to reconstruct the high resolution seismic visualization is performed as a batch process.

3. The method of claim 1, wherein at least one of: the low resolution seismic visualization or the high resolution seismic data includes two-dimensional or three-dimensional seismic data.

4. The method of claim 3, wherein at least one of: the low resolution seismic visualization or the high resolution seismic data comprises a seismic cube.

5. The method of claim 1, wherein at least one of: the low resolution seismic visualization or the high resolution seismic data includes one or more spatially-distributed derived seismic attributes.

6. The method of claim 1, wherein the super resolution machine learning model comprises a pixel-recursive super resolution model.

7. A system comprising:
    a visualization engine running in a virtual machine (VM) on a cloud server, wherein the visualization engine is configured to:
        receive high resolution seismic data, the high resolution seismic data representative of a portion of a subsurface formation;
        generate a high resolution seismic visualization of the subsurface formation from the high resolution seismic data, wherein the generating includes rendering of the high resolution seismic data;
        compress the high resolution seismic visualization to generate a low resolution seismic visualization; and
        communicate the low resolution seismic visualization from the cloud server to a remote visualization client; and
    the remote visualization client, wherein the remote visualization client is configured to:
        process the low resolution seismic visualization with a super resolution machine learning model to reconstruct the high resolution seismic visualization; and
        display the high resolution seismic visualization to a user.

8. The system of claim 7, wherein processing the low resolution seismic visualization with the super resolution machine learning model to reconstruct the high resolution seismic visualization is performed as a batch process.

9. The system of claim 7, wherein at least one of: the low resolution seismic visualization or the high resolution seismic data includes two-dimensional or three-dimensional seismic data.

10. The system of claim 9, wherein at least one of: the low resolution seismic visualization or the high resolution seismic data comprises a seismic cube.

11. The system of claim 7, wherein at least one of: the low resolution seismic visualization or the high resolution seismic data includes one or more spatially-distributed derived seismic attributes.

12. The system of claim 7, wherein the super resolution machine learning model comprises a pixel-recursive super resolution model.

13. A program product, comprising:
a non-transitory computer-readable medium; and
program code stored on the non-transitory computer-readable medium and configured upon execution by a computing system including one or more processors to render a seismic visualization by:
receiving high resolution seismic data at a visualization engine running in a virtual machine (VM) on a cloud server, the high resolution seismic data representative of a portion of a subsurface formation;
generating, at the visualization engine running in the VM on the cloud server, a high resolution seismic visualization of the subsurface formation from the high resolution seismic data, wherein the generating includes rendering of the high resolution seismic data;
compressing, at the visualization engine running in the VM on the cloud server, the high resolution seismic visualization to generate a low resolution seismic visualization;
communicating the low resolution seismic visualization from the cloud server to a remote visualization client;
processing, at the remote visualization client, the low resolution seismic visualization with a super resolution machine learning model to reconstruct the high resolution seismic visualization; and
displaying, via the remote visualization client, the high resolution seismic visualization to a user.

14. The program product of claim 13, wherein processing the low resolution seismic visualization with the super resolution machine learning model to reconstruct the high resolution seismic visualization is performed as a batch process.

15. The program product of claim 13, wherein at least one of: the low resolution seismic visualization or the high resolution seismic data two-dimensional or three-dimensional seismic data.

16. The program product of claim 15, wherein at least one of: the low resolution seismic visualization or the high resolution seismic data comprises a seismic cube.

17. The program product of claim 13, wherein at least one of: the low resolution seismic visualization or the high resolution seismic data includes one or more spatially-distributed derived seismic attributes.

18. The program product of claim 13, wherein the super resolution machine learning model comprises a pixel-recursive super resolution model.

* * * * *